United States Patent [19]

Schreiber

[11] Patent Number: 4,723,655

[45] Date of Patent: Feb. 9, 1988

[54] COMPACT FILM CARRIER

[76] Inventor: Martin H. Schreiber, Room 815, 611 Broadway, New York, N.Y. 10012

[21] Appl. No.: 938,508

[22] Filed: Dec. 5, 1986

[51] Int. Cl.⁴ ............................................. B65D 85/38
[52] U.S. Cl. .................................. 206/316; 150/52 J; 224/908; 206/408
[58] Field of Search ............... 206/316, 389, 391, 408, 206/455, 485, 523, 578, 814; 220/22; 224/908; 150/52 J; 215/100.5; 242/134, 137; 312/45

[56]  References Cited

U.S. PATENT DOCUMENTS

| | | | |
|---|---|---|---|
| 243,479 | 6/1881 | Ware | 206/391 |
| 1,698,058 | 1/1929 | Martin | 206/455 |
| 2,033,214 | 3/1936 | Wells et al. | 242/137 X |
| 2,103,241 | 12/1937 | Bell | 206/44 |
| 2,513,894 | 7/1950 | Rogers | 206/17 |
| 2,537,940 | 1/1951 | Peake | 206/814 X |
| 2,851,188 | 9/1958 | Pavelle | 220/97 |
| 3,206,016 | 9/1965 | Fowle et al. | 206/403 |
| 3,306,439 | 2/1967 | Storey | 206/392 |
| 3,312,338 | 4/1967 | Uterhart | 206/408 |
| 3,340,997 | 9/1967 | McCreery et al. | 206/404 |
| 3,355,061 | 11/1967 | Ritter | 206/389 X |
| 3,598,271 | 8/1971 | Holley | 215/100.5 X |
| 3,747,751 | 7/1973 | Miller et al. | 206/65 A |
| 3,793,528 | 2/1974 | Takeda | 250/482 |
| 3,927,809 | 12/1975 | Klein, Sr. | 224/5 R |
| 3,937,324 | 2/1976 | Whiteford | 206/349 |
| 4,033,455 | 7/1977 | Robison | 206/391 |
| 4,061,228 | 12/1977 | Johnson | 206/454 |
| 4,180,192 | 12/1979 | Breslau | 224/235 |
| 4,240,240 | 12/1980 | Cohen | 206/523 X |
| 4,282,441 | 8/1981 | Filoramo | 250/515 |

FOREIGN PATENT DOCUMENTS 411272  6/1910  France ............................... 206/459

Primary Examiner—William Price
Attorney, Agent, or Firm—Sherman and Shalloway

[57]  ABSTRACT

Disclosed herein is a container designed to store a large number of photographic film cartridges and/or spools. The container is preferably cylindrical and has placed therein a reversible plate having upstanding projections on one side compatible with a recess in one type of film canister, cartridge or spool and which has projections on the opposite side thereof which are compatible with a recess formed in another, different canister, cartridge or spool. The carrier has a lid with padded inside surfaces and the lid is threadably secured to the base portion of the carrier. The threads are sufficiently long so as to enable adjustability of the position of the lid with respect to the floor of the base portion so that the carrier is compatible with film carriers of differing lengths. Further, a spacer is disclosed which may be used with the present invention so as to enable diverse types of film carriers to be simultaneously stored therein. If desired, the inventive carrier may be made of a material including radiopaque properties.

3 Claims, 3 Drawing Figures

COMPACT FILM CARRIER

BACKGROUND OF THE INVENTION

The present invention relates to a compact film carrier. In the prior art, devices are known which are designed to store photographic films for easy transport. U.S. Pat. Nos. 2,851,188 to Pavelle, 3,927,809 to Klein, Sr. and 4,180,192 to Breslau each teach this general concept. However, none of these references teaches the ability to store cartridges of differing sizes in a single type of receptacle, none of these references teaches the specific shape and configuration of the present invention and none of these references teaches the use of a reversible plate which may be used to adapt the device to plural types of film containers.

Professional photographers, in the course of their work carry a large number of exposed and unexposed film devices wherever they go. In most cases these film devices are stored loosely in a camera bag or in the pockets of the photographer's clothing, in a disorganized manner. Thus, film devices are easily misplaced or lost and the significant cost of such film devices has caused a need for a film carrying device which may store a large number of film devices in an organized and safe manner.

Other patents are known to applicant which teach structural features generally related to the teachings of the present invention but which do not teach all of the aspects of the present invention when taken either alone or in combination with other references.

Thus, U.S. Pat. No. 2,513,894 to Rogers teaches a case for storing drills including a receptacle with a plurality of openings therein and a cover therefor. However, Rogers does not teach the adjustability of the device to adapt it for plutal film containers, for example. U.S. Pat. No. 3,747,751 to Miller, et al. discloses a storage container for a plurality of tubes wherein the base portion and the cover have structure which interacts with structure on the tubes to retain them in place. However, Miller, et al. do not disclose the adaptability of their container for tubes of differeing lengths nor do they disclose such adaptation through the use of a reversible plate.

U.S. Pat. No. 4,061,228 to Johnson discloses a container having a base portion and a cover having a padded deformable. panel to maintain pressure on the items contained therein. However, there is no contemplation by Johnson of the storage of film containers, nor does Johnson contemplate adjustability of the container to adapt to film containers of differing sizes.

U.S. Pat. No. 2,103,241 to Bell discloses a display device specifically designed for spools of thread including a base portion to store the thread spools and a cover therefor. Of course, again, there is no teaching or suggestion in Bell of the adaptation of the device for spools of differeing sizes not to mention film containers.

U.S. Pat. No. 3,937,324 to Whiteford discloses a container for a plurality of diverse tools wherein a threaded cover 12 is provided to threadedly overlie the base portion 10 thereof. While this patent does teach a threadable cover, there is no contemplation in this patent of providing such threaded structure for the purpose of adaptation to tools of differing sizes not to mention film containers.

U.S. Pat. No. 4,282,441 to Filoramo and U.S. Pat. No. 3,793,528 to Takeda discloses devices for carrying cameras and/or film and including structure to protect the film from radiation damage. Other examples of radiopaque materials are taught by U.S. Pat. Nos. 3,514,607 to Webster and 3,609,372 to Vogel. It is noted that Filoramo and Takeda are only generally related to the teachings of the present invention as teaching the use of radiopaque material since the specific structures of the inventions disclosed in these patents bear no relation to the teachings of the present invention.

Accordingly, a need has developed for a film carrying device which is compact in size, may store a large number of films therein, and which is versatile enough to enable the storing of films of differing types either separately or simulatneously.

SUMMARY OF THE INVENTION

The present invention overcomes the deficiencies in the prior art as set forth hereinabove, and provides an improved compact film carrier which enables the storage of a plurality of film canisters of two differing types, either mixed together within the container or unmixed. The present invention includes the following interrelated structures and aspects:

(a) The inventive film carrier includes a base portion, preferably of generally cylindrical configuration. On the outer, upper periphery of the base portion, threads are formed which are designed to cooperate with the lid of the inventive film carrier.

(b) The lid is also, preferably, of generally cylindrical configuration and includes internal threads which are complementary to the threads of the base portion so that the lid may be threaded over the base portion so as to secure the lid and base portion together. Inside the lid, a padded surface is provided which is designed to resiliently engage the film canisters contained within the base portion as the lid is threaded over the base portion so as to resiliently secure the film canisters in their inserted position within the base portion.

(c) A reversible plate is inserted into the base portion and is designed to rest on the bottom thereof. The reversible plate includes two opposed faces, each of which includes a plurality of projections upstanding therefrom. Each face has upstanding therefrom only projections of a specific type. Thus, a first face has upstanding therefrom first projections which are each designed to couple with a recess formed in a first type of film canister whereas projections upstanding from a second face are of a second type designed to couple with recesses formed in a second type of film canister. Thus, the present invention may be used with differing types of film canisters merely through reversal of the reversible plate. In conjunction with this aspect, the wide adjustability of the position of the lid with respect to the base portion allows accommodation for differing types of film canisters which differ not only as to the shape of their recess but also as to their length.

(d) With the invention described as set forth hereinabove, it may be used to store film canisters all of one type or all of another type through selective reversal of the reversible plate and selective threadable movement of the lid with respect to the base portion to accommodate two film canisters of differing sizes. If, however, it is desired to store diverse types of film canisters simultaneously within the film carrier, the present invention also contemplates the provision of a space device having a recess at one end adapted to couple with a projection on one side of the reversible plate and having a projection on its other end adapted to enter the appropriate recess on a film canister which is shorter than the film canisters which would normally be supported within the base portion with the reversible plate in its present position. Thus, the spacers are utilized to increase the elevations of the tops of the shorter film canisters so that all film canisters within the base portion are equally compressed therein through the interaction therewith by the padded portion of the threaded lid.

Accordingly, it is a first object of the present invention to provide an improved compact film carrier.

It is further object of the present invention to provide such an improved compact film carrier with structure enabling it to be usable with film canisters of diverse types.

It is a still further object of the present invention to provide such an improved compact film carrier with structure enabling it to be used with film canisters of differing types either separately or simultaneously.

It is a still further object of the present invention to provide such a compact film carrier with structure enabling it to be adaptable to film canisters of differing lengths.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
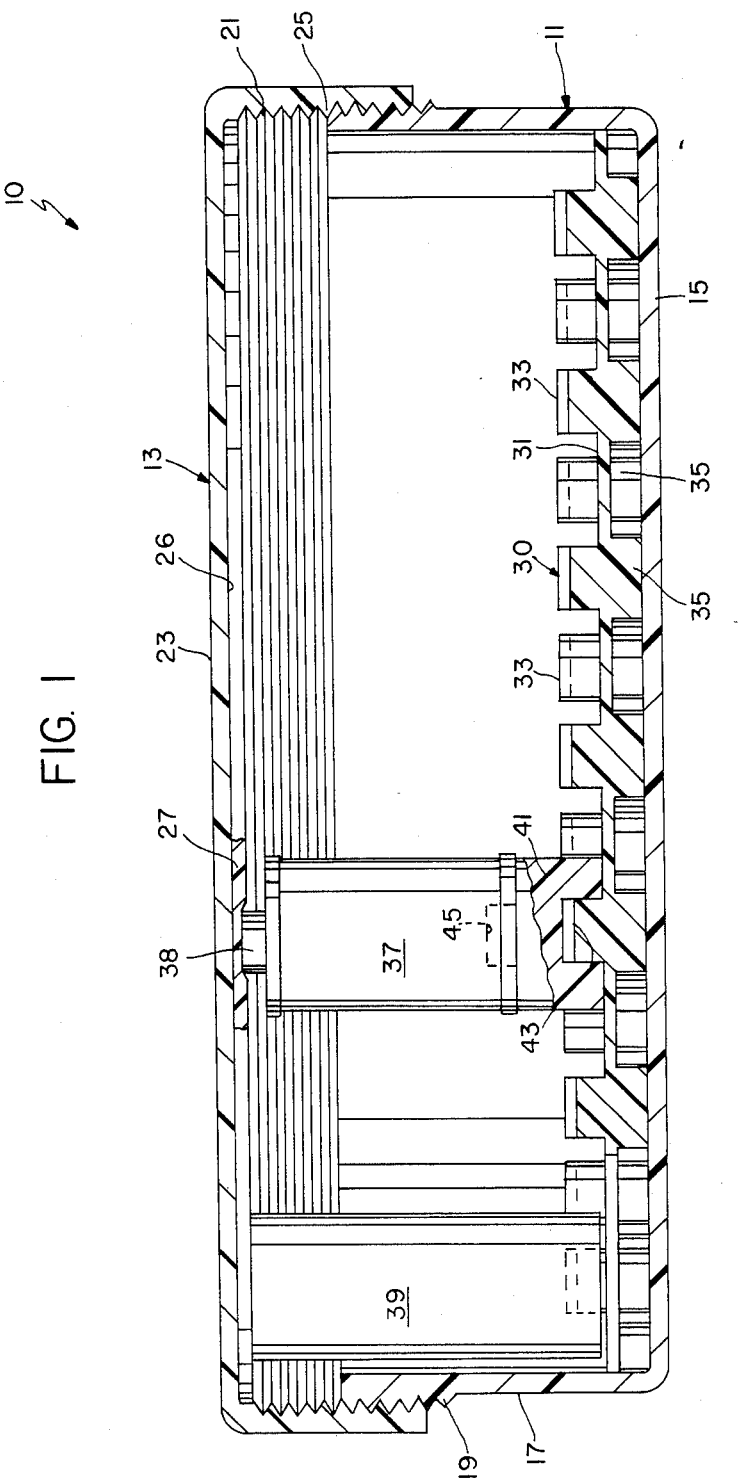
FIG. 1 shows a cross-sectional view through the preferred embodiment of the present invention.

The inventive compact film carrier is generally designated in FIG. 1 by reference numeral 10, and is seen to include a base portion 11 and a lid 13 mounted thereover. As best seen in FIG. 1, the base portion 11 includes a bottom 15 and a vertical wall 17 having its upper portion covered by circumferential threads 19. The walls 17, in the preferred embodiment of the present invention, are of generally cylindrical configuration.

With further reference to FIG. 1, the lid 13 includes generally cylindrical walls 21 and a top 23 which, in assembly of the lid 13 to the base portion 11 faces the bottom 15 of the base portion 11.

As seen in FIG. 1, the walls 21 are internally threaded at 25 with the threads 25 being complementary to the threads 19 of the base portion 11 so that the lid 13 may be threaded over the base portion 11 in the assembly of the lid to the base portion.

As further seen in FIG. 1, the top 23 of the lid 13 has on its undersurface a padded portion 27 made, for example, of a foamed plastic material which is suitably attached to the undersurface 26 of the top 23 for a purpose to be described in greater detail hereinafter.

Figure 3:
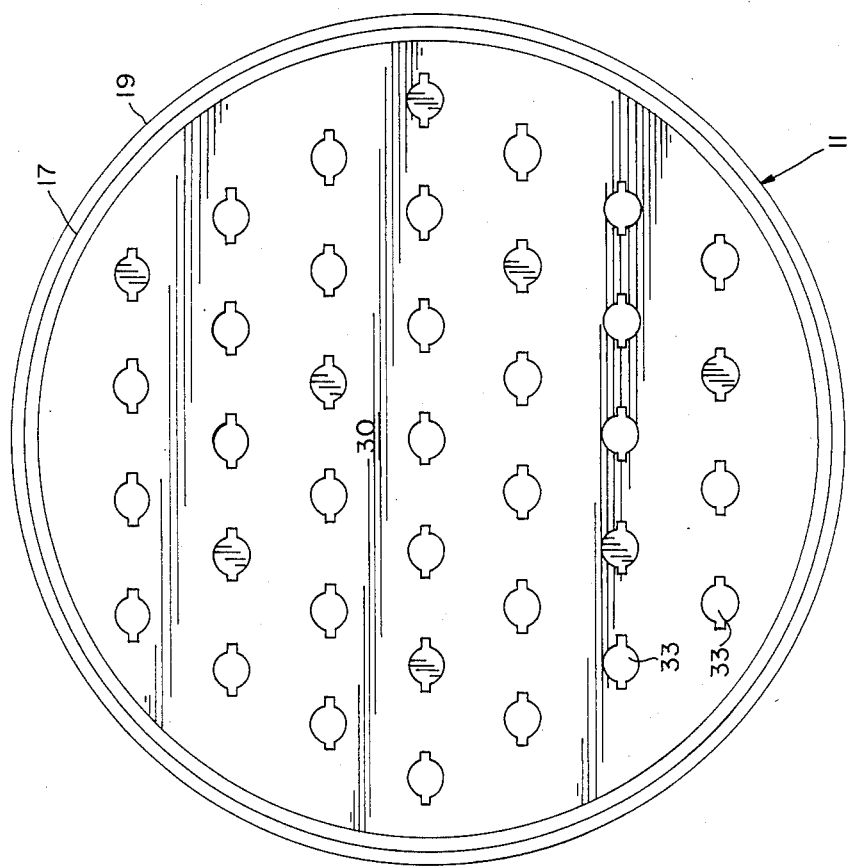
FIG. 3 shows a top view of the base portion of the present invention with the reversible plate inserted therein in a second orientation.
Figure 2:
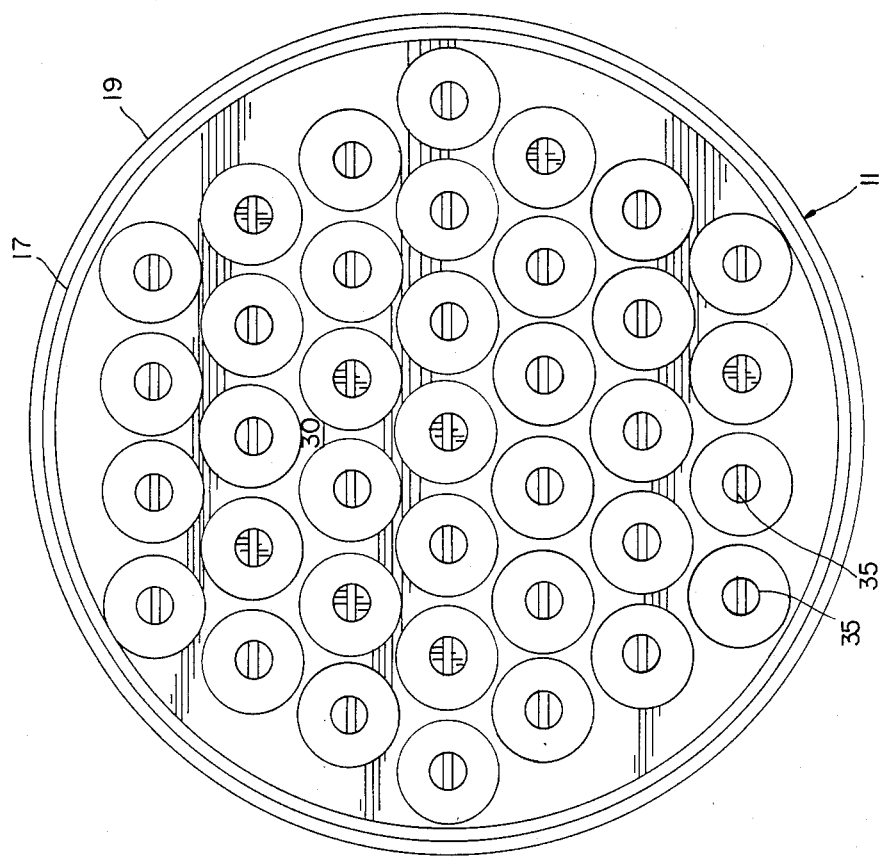
FIG. 2 shows a top view of the base portion of the present invention with the reversible plate inserted therein in a first orientation.

With reference now to FIGS. 1, 2 and 3, inserted in the base portion is a reversible plate 30 including a plate portion 31 and projections 33 and 35 respectively extending outwardly from the plate portion 31 in both directions therefrom. FIG. 2 shows the reversible plate 30 with the projections 35 facing upwardly whereas FIG. 3 shows the reversible plate 30 flipped over with respect to its orientation shown in FIG. 2 so that the projections 33 now face upwardly, in the same manner as shown in FIG. 1.

As should be understood by those skilled in the art, the projections 35, in the example shown herein, are sized and configured so that they are each compatible with the recess formed in the bottom of a 35 millimeter film canister. In a similar way, the projections 33 are sized and configured so that they are compatible with the recess which is formed in either end of a 120/220 film spool. In FIG. 1, a 35 millimeter film canister is designated by the reference numeral 37 whereas a 120/220 film spool is designated by the reference numeral 39. It is to be stressed that these are merely examples of the film canisters which may be utilized in the present invention and of course the present invention is adaptable to any type of film canister including, for example, cartridges.

With reference again to FIG. 1, it is seen that the 35 millimeter canister 37 is contained within the inventive carrier simultaneously with the retention of the 120/220 spool 39. This is possible due to the inclusion of the spacer 41. The spacer 41 is provided to make up for the fact that the 35 millimeter canister 37 is shorter in length than the length of the 120/220 spool 39. The spacer 41 includes a recess 43 and a projection 45. The recess 43 in the embodiment shown is designed to receive in coupled relation the projection 33 corresponding to that which is insertable in a 120/220 spool 39 recess. The projection 45 corresponds to the projections 35 which are designed to couple with the recess formed in the bottom of a 35 millimeter film canister such as that which is shown in FIG. 1 and designated by the reference numeral 37. Of course, instead of the projection 45, the spacer 41 may be provided with a recess compatible with the projection 38 of the film canister 37 or, alternatively, other constructions may be provided with their sole purpose being to make up the difference in length between a shorter spool and a longer spool which are to be stored simultaneously within the carrier 10.

As should be understood from FIG. 1, when the lid 13 is threadingly engaged over the base portion 11, the resilient portion 27 resiliently engages the tops of the canisters 37 and spool 39 to thereby resiliently bias them in a downward direction. This aids in frictionally retaining the film spools and canisters in position within the carrier 10.

In the preferred embodiment of the present invention, the base portion 11, lid 13 and reversible plate 30 are made of moldable plastic such as, for example, polyvinylchloride, polypropylene or the like. If desired, the materials from which the present invention is made may include integrally therewith materials which resist the penetration of X-rays so as to protect the film from damage when the carrier thereof walks through screening devices at airports. Thus, for example, a material from which the present invention may be made consists of 70 percent polyvinylchloride with barium sulfate in the amount of 30 percent. Of course, the inventive carrier may be made in various colors so that a photographer can tell by the color which type of film is within the container without having to open the container.

Regarding the preferred dimensions for the inventive film carrier, it must be tall enough to accommodate the height of 120/220 film spools which are about 2 9/16" high with the walls being long enough to allow the respective threads 19, 25 to interact to fasten the lid 13 on the base 11. Further, the inner diameter of the wall 17 of the base 11, when made approximately 7⅛", will result in base 11 which will hold 40 films of either 35 millimeter or 120/220 type, since each type is about one inch in diameter. The above recited dimensions, of course, are not to be considered limiting. However, a carrier dimensioned to hold 20 to 70 film devices would be a preferred size.

Accordingly, an invention has been disclosed in terms of a preferred embodiment thereof which fulfills each and every one of the objects of the invention as set forth hereinabove and provides a new improved film carrying device with great versatility, ease of use and utility. Of course, various changes, modifications and alterations in the teachings of the present invention may be contemplated by those skilled in the art and these modifications, changes and alterations are considered by applicant to be included within the purview of the present invention. Accordingly it is intended that the present invention only be limited by the terms of the appended claims.

I claim:

1. A compact photographic film carrier impervious to x-rays for carrying a plurality of photographic film means comprising:
   (a) a base portion including a bottom and walls surrounding said bottom;
   (b) a lid removably attachable to said base portion and having a cover and walls surrounding said cover, the distance between said cover and bottom being selectively adjustable; and
   (c) coupling means in said base portion for rendering said carrier compatible with film means of diverse sizes, said coupling means comprising:
      (1) a reversible plate having two opposed faces, a first face thereof having a plurality of first projections being compatible with a first recess formed in a first standard film means, and a second face thereof having a plurality of second projections being compatible with a second recess formed in a second standard film means; and
      (2) a spacer adapted to be coupled to said first standard film means, said first standard film means being shorter in length than said second standard film means and said spacer making up the difference in the lengths of said first and second standard film means.

2. The invention of claim 1, further wherein said base portion walls and said lid walls are provided with cooperable threads so that said lid may be threadingly attached to said base portion, said threads facilitating said selective adjustability of said distance.

3. The invention of claim 1, further wherein said cover includes a resilient inner surface for engagement with said film means.

* * * * *